April 30, 1935.  J. R. MAHAN  2,000,001
BEARING
Filed Sept. 20, 1932  2 Sheets-Sheet 1
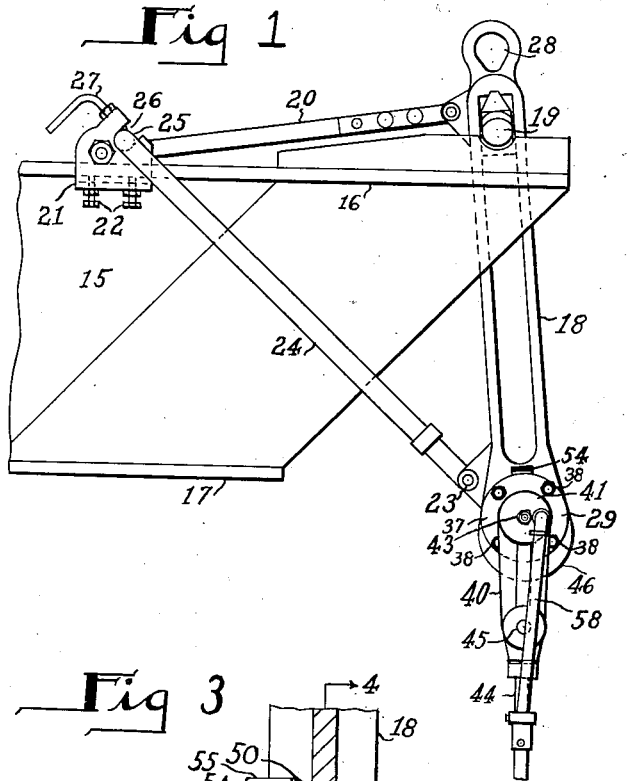
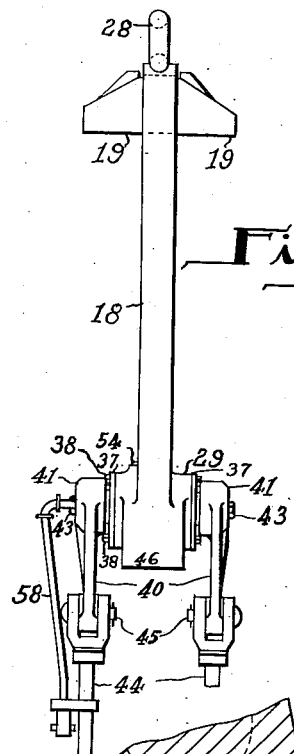
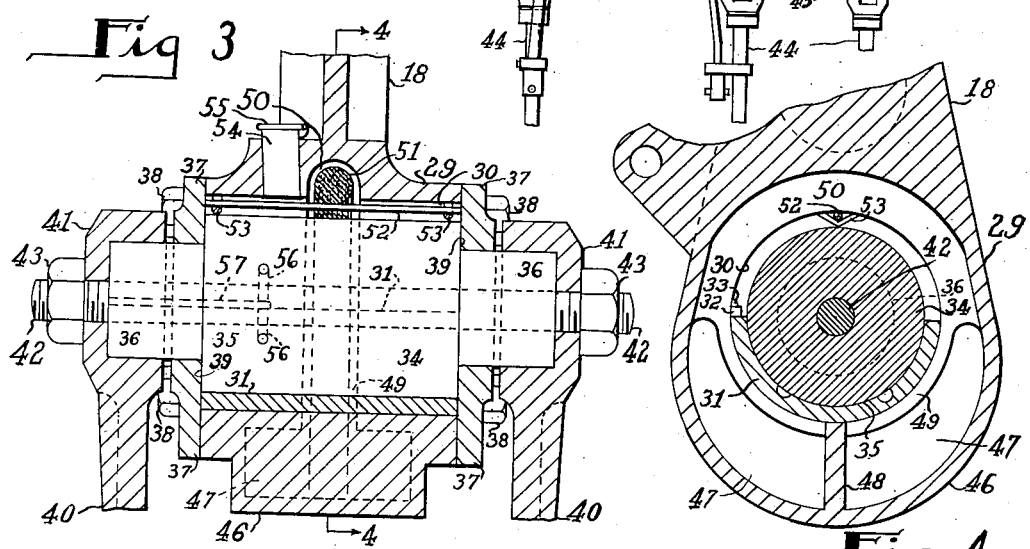
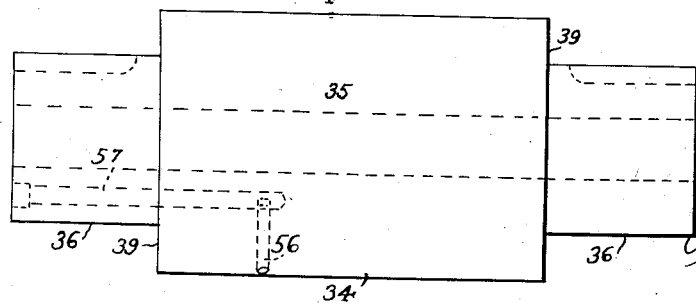
INVENTOR
J. R. Mahan
by F. N. Barker
Attorney

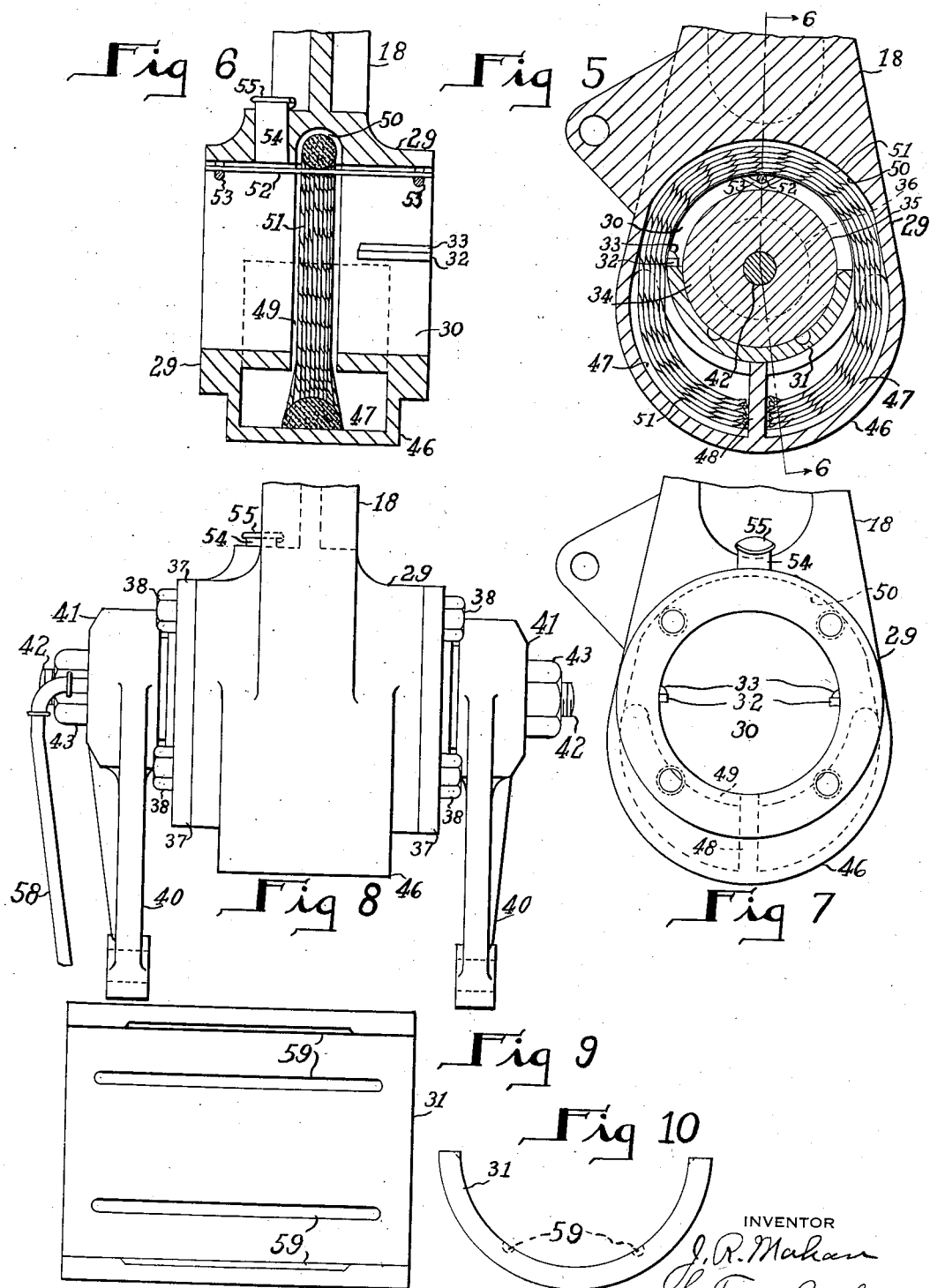

Patented Apr. 30, 1935

2,000,001

UNITED STATES PATENT OFFICE 2,000,001

BEARING

Joseph R. Mahan, Toledo, Ohio, assignor to The National-Superior Company, Toledo, Ohio, a corporation of Delaware Application September 20, 1932, Serial No. 633,946

2 Claims. (Cl. 308—78)

This invention relates to bearings designed for connecting the lower end of a beam-hanger for a pump rod to the reins which connect the bearing to the pump rod or string, though the bearings are adapted for use with other apparatus besides pumps.

One object of the invention is to provide a pivot pin having a rather large central portion provided with axial extensions of smaller diameter to support reins or their equivalent. Another object is to provide novel means for retaining the pin in its housing. Another object is to provide novel means for lubricating the bearing surfaces between the pin and its housing or casing. Additional objects appear hereinafter.

Referring to the accompanying drawings, Fig. 1 is a side elevation of one end of a walking beam and a beam-hanger carried thereby and provided with my improved bearing and one of the reins broken off; Fig. 2, an elevation of the beam-hanger, the bearing and the reins suspended therefrom, as they appear when looking at Fig. 1 from the right, the reins being broken away below; Fig. 3, a vertical longitudinal section through the bearing, the reins being in longitudinal section and broken off; Fig. 4, a transverse vertical section on the line 4—4 on Fig. 3, the wick being omitted; Fig. 5, a transverse section through the casing for the bearing pin, the wick being shown, adjacent parts being in side elevation and broken away; Fig. 6, a section on the line 6—6 of Fig. 5; Fig. 7, an end view of Fig. 6 in its complete tubular form; Fig. 8, a side elevation of the casing and the upper ends of the reins; Fig. 9, a plan view of the liner or semi-cylindrical bearing in which the large central portion of the bearing pin lies; Fig. 10, an end view of Fig. 9; and Fig. 11, a side view of the bearing. Figs. 3 to 11 are on a larger scale than Figs. 1 and 2.

In Fig. 1, I show one end of a walking beam having the web 15 connecting together the upper flange 16 of the beam to the lower flange 17 thereof. 18 is a suspension bar of a beam-hanger and has its upper end provided with the trunnion or cross-pin 19, supported by the upper flange 16. The upper end of the bar 18 is connected by the tie-bar 20 to the anchor means 21 secured to the flange 16 by bolts 22. The lower end of the bar 18 is hingedly connected by the pin 23 to the anchor means by the brace member 24. The horizontal upper end 25 of the brace member is held in the notch 26 in the anchor means by the set-screw 27. 28 is an eye in the bar 18 for the connection of a hoisting hook or the like. The apparatus so far described forms a fixed triangular hanger which is rigid when the apparatus is in use and moves in complete unison with the walking beam, and forms the subject matter of Letters Patent No. 1,982,615, issued November 27, 1934.

The lower end of the suspension bar 18 has the horizontal housing or casing 29 having the large horizontal opening or bore 30. The lower half of the bore is provided with the semi-cylindrical bearing or liner 31, having its upper edges in engagement with the keys or bars 32 which may be welded to the inner bight of the bore 30, as shown at 33

34 is a cylindrical bearing pin as a whole, having the section 35 of large diameter lying in the liner 31 and the end sections 36 of smaller or reduced diameter. The ends of the casing 29 are provided with covers or caps 37 having openings to receive the sections 36 which project beyond the covers. The caps fit against the ends of the casing to which they are secured by bolts 38. The section 35 of the bearing pin 34 has at its ends the shoulders 39 which bear against the inner faces of the caps.

The portions of the end sections 36 projecting beyond the caps 37 form gudgeons or bearings for the pendent members or links 40 whose upper ends 41 are cup-shaped to fit the said gudgeons. The bolt or tie-rod 42 extends axially through the bearing pin 34 and the cup-shaped ends 41 of the members 40, there being nuts 43 on the ends of the bolt 42 screwed up against the outer faces of the cup-shaped ends 41 to hold the members 40 from moving longitudinally of the pin 34. To the lower end of the members 40 the rods 44, which may be reins for connection to a pump-rod, are pivotally connected by the pins 45.

The casing 29 has at its lower side an extension 46, having therein chambers 47 separated by the partitions 48. The chamber communicates with the bore 30 through the opening 49. The interior wall of the casing has a semi-circular groove 50 surrounding the upper half of the bearing pin section 35, this groove communicating at its lower ends with the upper ends of the chambers 47, as shown best in Fig. 4. A length of wicking 51 lies in the groove 50 and hangs down in the chambers 47, the upper portion of the wicking being looped over and supported by the rod 52 held in place by the V-shaped clips 53 secured to the inner wall of the casing 29.

The wicking is held away from the sides of the pin 34 by the bearing 31 and is supported above and out of contact with the pin by the rod 52.

Lubricant is supplied to the interior of the casing through the tube 54 having the cap 55. Lubricant is supplied to the bearing surface of the liner 31 through the transverse passages 56 in the bearing pin, these passages receiving lubricant through the longitudinal passage 57 in the bearing pin. The passage 57 is supplied with lubricant through the pendent pipe 58 which may be fed by a suitable grease gun. The inner face of the liner 31 has the grooves 59 to retain lubricant. The wicking 51 by capillary attraction raises lubricant from the chambers 47 to supply lubricant to the bearing pin 34.

I claim:—

1. In a bearing for use in a well pumping apparatus comprising a walking beam, a suspension member depending from the walking beam, and hoisting links, the combination of a casing carried by the lower end of the suspension member and having a horizontal opening, a reservoir in said casing below the opening, a semi-cylindrical bearing member in the opening above said reservoir, a bearing pin having its intermediate portion journaled in the bearing member, a trunnion projecting from each end of said intermediate portion of the pin, cup shaped members fixed to said trunnions in spaced relation from said casing and having integral pendent members arranged for oscillably supporting the hoisting links, a rod extending longitudinally through the pin, and means on the rod to prevent the escape of the cup shaped members.

2. In a bearing for use in well pumping apparatus comprising a walking beam, a suspension member depending from the walking beam and hoisting links, the combination of a casing carried by the lower end of the suspension member and having a horizontal opening of relatively large diameter, a bearing pin having its intermediate portion journaled in the opening and a trunnion of smaller diameter projecting from each end of the said intermediate portion of the pin for supporting the hoisting links, caps fixed to the ends of the casing and having openings though which the trunnions project, thereby forming a sealed chamber to retain a bath of lubricant at a level between the perimetral surfaces of the intermediate and trunnion portions of said pin, a rod extending longitudinally through the pin, and means on the rod and links to prevent the escape of the links from the trunnions.

JOSEPH R. MAHAN.